United States Patent
Belmon et al.

(10) Patent No.: US 11,898,517 B2
(45) Date of Patent: Feb. 13, 2024

(54) TURBOFAN ENGINE COMPRISING AN OUTLET CONE COOLED BY ITS SECONDARY FLOW

(71) Applicant: SAFRAN AIRCRAFT ENGINES, Paris (FR)

(72) Inventors: Guillaume Claude Robert Belmon, Moissy-Cramayel (FR); Cédric Zaccardi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 288 days.

(21) Appl. No.: 17/297,079

(22) PCT Filed: Nov. 21, 2019

(86) PCT No.: PCT/FR2019/052777
§ 371 (c)(1),
(2) Date: May 26, 2021

(87) PCT Pub. No.: WO2020/109705
PCT Pub. Date: Jun. 4, 2020

(65) Prior Publication Data
US 2022/0025833 A1    Jan. 27, 2022

(30) Foreign Application Priority Data

Nov. 27, 2018    (FR) .................................... 1871932

(51) Int. Cl.
*F02K 1/82*    (2006.01)
*F01D 9/06*    (2006.01)
(Continued)

(52) U.S. Cl.
CPC .............. *F02K 1/822* (2013.01); *F01D 9/065* (2013.01); *F02C 7/06* (2013.01); *F02K 1/04* (2013.01);
(Continued)

(58) Field of Classification Search
CPC .... F02C 3/067; F02C 7/18; F02C 3/32; F05D 2250/44; F05D 2260/601; F02K 3/072;
(Continued)

(56) References Cited

U.S. PATENT DOCUMENTS 6,260,352 B1 *   7/2001   Negulescu ................ F02K 3/04
                                                          60/262
8,979,477 B2 *   3/2015   Johnson ................ F01D 25/162
                                                          415/111
(Continued)

FOREIGN PATENT DOCUMENTS

CN    103016154 A  *  4/2013
CN    103016154 A     4/2013
(Continued)

OTHER PUBLICATIONS

Search Report issued in French Patent Application No. 1871932 dated Jul. 11, 2019.
(Continued)

*Primary Examiner* — Stephanie Sebasco Cheng
(74) *Attorney, Agent, or Firm* — Pearne & Gordon, LLP

(57) ABSTRACT

A turbofan engine including an exhaust casing traversed by a primary flow and surrounded by a secondary flow and an outlet cone carried by this exhaust casing, the exhaust casing and the outlet cone together defining an internal space. The exhaust casing includes a hollow radial arm traversing the primary flow in order to convey part of the secondary flow so as to form a cooling flow for supplying the internal space, and the outlet cone is terminated by an opening for discharging the cooling flow.

7 Claims, 2 Drawing Sheets

(51) Int. Cl.
*F02K 1/04* (2006.01)
*F02C 7/06* (2006.01)
*F01D 25/14* (2006.01)
*F01D 25/26* (2006.01)

(52) U.S. Cl.
CPC .............. *F01D 25/14* (2013.01); *F01D 25/26* (2013.01); *F05D 2220/323* (2013.01); *F05D 2250/232* (2013.01); *F05D 2260/205* (2013.01)

(58) Field of Classification Search
CPC ........ F02K 1/00–827; F01D 1/24; F01D 5/18; F01D 5/187–189; F01D 25/14–145; F01D 9/06–065
See application file for complete search history.

(56) References Cited

U.S. PATENT DOCUMENTS

| | | | | |
|---|---|---|---|---|
| 11,371,379 | B2* | 6/2022 | van der Merwe ... | H02K 7/1823 |
| 11,598,268 | B2* | 3/2023 | Belmon .................... | F02C 7/36 |
| 2013/0133336 | A1* | 5/2013 | Barnett .................. | F01D 25/04 |
| | | | | 248/671 |
| 2014/0286763 | A1* | 9/2014 | Munshi ................... | F01D 25/12 |
| | | | | 415/178 |
| 2022/0010735 | A1* | 1/2022 | Belmon ................ | F01D 25/125 |
| 2022/0045573 | A1* | 2/2022 | Seki ....................... | H02K 5/225 |

FOREIGN PATENT DOCUMENTS

| | | | |
|---|---|---|---|
| CN | 104819016 | B | 9/2016 |
| DE | 768041 | C * | 5/1955 |
| EP | 0938624 | | 9/1999 |
| FR | 2824598 | A1 | 11/2002 |
| FR | 2897655 | A1 | 8/2007 |
| FR | 3062678 | A1 | 8/2018 |
| GB | 695482 | A | 8/1953 |

OTHER PUBLICATIONS

International Search Report for issued in Application No. PCT/FR2019/052777 dated Mar. 11, 2020.
Written Opinion for PCT/FR2019/052777 dated Mar. 11, 2020.
Translation of Office Action for corresponding Chinese application No. 2019800747966 dated Nov. 2, 2022.

* cited by examiner

US 11,898,517 B2

TURBOFAN ENGINE COMPRISING AN OUTLET CONE COOLED BY ITS SECONDARY FLOW

This is the National Stage of PCT international application PCT/FR2019/052777, filed on Nov. 21, 2019 entitled "TURBOFAN ENGINE COMPRISING AN OUTLET CONE COOLED BY ITS SECONDARY FLOW", which claims the priority of French Patent Application No. 1871932 filed Nov. 27, 2018, both of which are incorporated herein by reference in their entirety.

TECHNICAL FIELD

The invention relates to a turbofan engine arrangement including, downstream, an outlet cone, enclosing components the cooling of which is optimised.

PRIOR ART

In such an engine 1 represented in FIG. 1, air is drawn into an inlet duct 2 to pass through a fan 3 including a series of rotating blades before being split into a central primary flow and a secondary flow surrounding the primary flow.

The primary flow is then compressed in compression stages 4 and 6 before reaching a combustion chamber 7, after which it expands through a high-pressure turbine 8 and a low-pressure turbine 9 before being discharged rearwards. In turn, the secondary flow is propelled directly rearwards by the fan within a flow path delimited by the casing 11.

Such a twin-spool type engine includes a so-called low-pressure spool by which the fan 3 is coupled to the low-pressure turbine 9, and a so-called high-pressure spool by which the high-pressure compressor 6 is coupled to the high-pressure turbine 8, these two spools being coaxial and rotatably independent of each other.

Downstream of the low-pressure turbine 9, this engine is equipped with an outlet cone 10 to limit the formation of turbulences in the primary flow ejected by the low-pressure turbine 9. This outlet cone 10 usually encloses components of the engine such as a reduction gear, a gearbox, a hydraulic pump or others, which generate heat and therefore have to be cooled.

The aim of the invention is to provide a solution to optimise the cooling of the components installed within the outlet cone of such an engine.

DISCLOSURE OF THE INVENTION

To this end, an object of the invention is a turbofan engine including an exhaust casing through which passes a primary flow and surrounded by a secondary flow both circulating from upstream to downstream of the turbofan engine during operation, and an outlet cone having an upstream end carried by this exhaust casing, the outlet cone delimiting an inner space, the exhaust casing includes a hollow radial arm crossing the primary flow which conveys part of the secondary flow in order to form a cooling flow to cool down one or several component(s) located in the inner space, and in that the outlet cone terminates in an opening for discharging the cooling flow.

With this arrangement, the components installed within the outlet cone are cooled down with fresh air, so that it is possible to install components generating a higher thermal power and/or in a larger number within this cone.

The invention also relates to a turbofan engine defined in this manner, wherein the outlet cone includes a main wall and an inner lining wall which runs along the main wall while being spaced therefrom so as to delimit, together with this main wall, an inter-wall space, and wherein a portion of the cooling flow passes through the inter-wall space before being discharged by the outlet opening.

The invention also relates to a turbofan engine defined in this manner, wherein the radial arm terminates in a scoop soaking in the secondary flow to promote sampling of the cooling flow.

The invention also relates to a turbofan engine defined in this manner, wherein the outlet is formed by a cylindrical extension of the cone.

The invention also relates to a turbofan engine defined in this manner, wherein the outlet is formed by coaxial cylindrical extension of the main wall and cylindrical extension of the lining wall.

The invention also relates to a turbofan engine defined in this manner, comprising a low-pressure turbine driving a central shaft via a planetary or epicyclic reduction gear, and wherein this reduction gear is located in the inner space.

The invention also relates to a turbofan engine defined in this manner, comprising a central shaft and a bearing for holding this central shaft which is located in the inner space.

DETAILED DISCLOSURE OF PARTICULAR EMBODIMENTS

Figure 1:
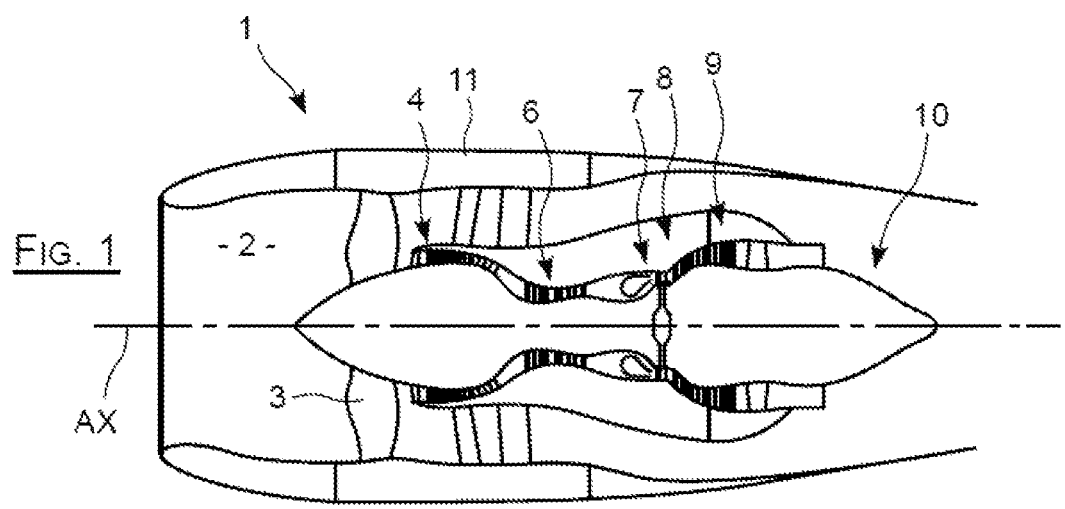
FIG. 1 is a longitudinal sectional view of a known turbofan engine.
Figure 2:
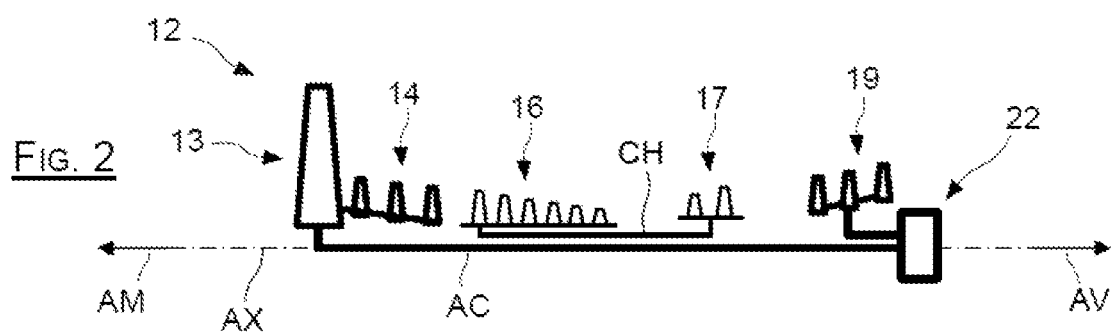
FIG. 2 is a general schematic longitudinal sectional view of a turbofan engine architecture in which the invention is implemented.

As schematically represented in FIG. 2, the engine according to the invention comprises a fan 13 at its upstream portion AM followed by a low-pressure compressor 14 which are driven by a central shaft AC, the fan being crossed by the entirety of the flow entering this engine comprising a central primary flow FP and a secondary flow FS surrounding the primary flow.

As it should now be clear, the upstream AM and downstream AV directions are defined with respect to the direction of circulation of the flow in the engine along its longitudinal axis AX, in accordance with usual conventions. Similarly, the inner and outer radial directions or positions are defined with respect to a central longitudinal axis AX of the engine.

In this engine, a high-pressure compressor 16 located immediately downstream AV of the low-pressure compressor 14 compresses the fluid of the primary flow having passed therethrough, before getting in a non-represented combustion chamber located downstream.

After having passed through the combustion chamber, the fluid expands in a high-pressure turbine 17 which drives the high-pressure compressor 16, this compressor 16 and the turbine 17 being carried by a high-pressure spool CH which surrounds the central shaft AC while being rotatably independent thereof.

Figure 3:
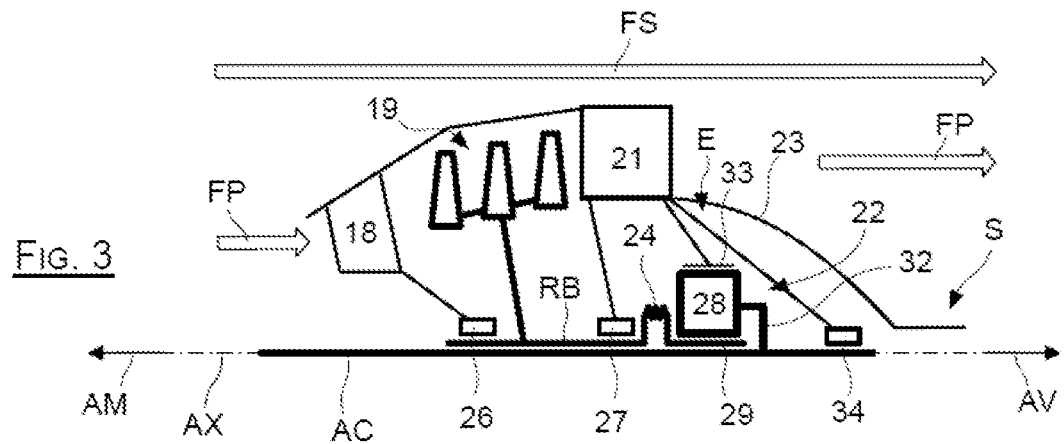
FIG. 3 is a schematic longitudinal sectional view of a downstream portion of the turbofan engine architecture in which the invention is implemented.

After having passed through the high-pressure turbine 17, the fluid transits in an inter-turbine casing bearing the reference numeral 18 in FIG. 3, before passing through a low-pressure turbine 19, and is then discharged through an exhaust casing 21. This low-pressure turbine 19 is rotatably connected to the central shaft by an epicyclic reduction gear 22 located downstream AV, and thanks to which it rotates faster than the fan 13.

As shown in FIG. 3, the exhaust casing 21 carries an outlet cone 23 which closes the downstream region of the engine located radially inward of the primary flow path, that is to say the flow path within which the primary flow FP circulates, this outlet cone 23 extending downstream from an upstream end 25 by which it is carried by the casing 21.

The reduction gear 22 is located inside an inner space E delimited by the outlet cone 23 extending this casing 21, while being connected to the central shaft AC and to a rotor RB carrying the low-pressure turbine.

This rotor RB which surrounds the central shaft AC extends from a middle portion by which it carries the low-pressure turbine 19, up to a downstream portion by which it is coupled to the reduction gear 22. This rotor RB includes in its central region a radially-flexible element 24 which is soft according to the radial direction to enable off-centring of the upstream portion of the rotor RB with respect to its downstream portion while ensuring a torque transmission.

The low-pressure rotor RB is held by an upstream bearing 26 located upstream of the low-pressure turbine 19 and by a downstream bearing 27 located between this low-pressure turbine 19 and the flexible element 24. The rotor upstream bearing 26 is carried by the inter-turbine casing 18, and the rotor downstream bearing 27 is carried by the exhaust casing 21. At least one of the two rotor bearings 26 and 27 is a thrust bearing, that is to say taking up the axial thrust force generated by the low-pressure turbine to transfer it to the structure of the engine.

The reduction gear 22 includes planet pinions 28 surrounding an inner crown 29 and surrounded by an outer crown 33 while each of them meshes with these two crowns, these pinions 28 being carried by a planet carrier 32.

In this instance, the reduction gear 22 is of the epicyclic type, that is to say the planet carrier 32 is rotatably movable while being carried by the central shaft AC. In turn, the inner crown 29 is rigidly secured to the low-pressure rotor RB while the outer crown 33 is rigidly secured to the exhaust casing 21 while being carried thereby. This reduction gear 22 may also consist of a planetary reduction gear, wherein the planet carrier is carried by the exhaust casing, the outer crown then being carried by the central shaft.

The central shaft AC is carried by an upstream bearing, not shown in FIG. 3 and located at the upstream portion of the engine, and by a central shaft downstream bearing 34 located downstream of the reduction gear 22, while being carried by the exhaust casing 21, this downstream bearing 34 being located in the inner space E of the outlet cone 23.

In this general architecture, the reduction gear 22 as well as the downstream bearing 34 of the central shaft, which are installed in the space E, generate a significant amount of heat. To limit heating up of these components, this heat is dissipated thanks to the advantageous design of the exhaust casing 21 and of the outlet cone 23 carried thereby.

Figure 4:
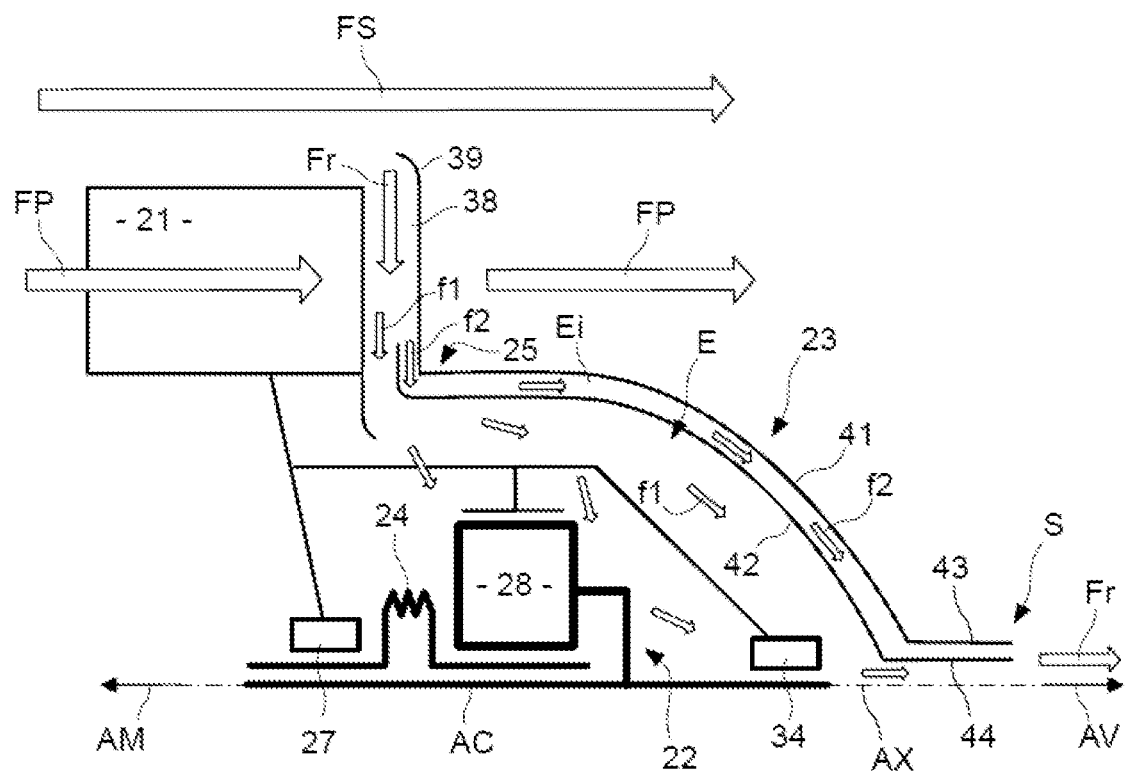
FIG. 4 is a schematic longitudinal sectional view of cooling of the outlet cone according to the invention.

Thus, as shown in FIG. 4, at least one of the radial arms 38 of the exhaust casing 21, crossing the primary flow path within which the primary flow FP circulates, is hollow. This radial arm 38 is arranged so as to convey fresh air originating from the secondary flow FS which circulates within the secondary flow path towards the inner space E.

The cooling flow, denoted Fr, which is sampled in the secondary flow path, flows radially within the arm 38 towards the inner space E to ventilate it so as to dissipate the heat generated by the components such as the reduction gear 22 and the shaft bearing 34, the flow that ventilates this inner space being discharged by an outlet S at the downstream end of the cone 23. This outlet S is an opening formed at the central end of the cone 23.

To promote sampling of the cooling flow Fr in the secondary flow FS, the radial arm 38 advantageously terminates in a scoop 39 which projects radially from an outer face of the exhaust casing 21 in the secondary flow path, this scoop 39 including an opening directed upstream AM to collect air conveyed by the radial arm towards the inner space E.

To improve cooling, the cone 23 includes an outer main wall 41 and an inner lining 42, that is to say another wall that runs along its inner face while being at a short distance therefrom, in order to delimit an inter-wall space Ei within which part of the cooling flow Fr circulates. As shown in FIG. 4, the inner lining 42 runs along the inner face of the main wall 41 parallel thereto and over most of its surface.

More particularly, once the cooling flow Fr has covered the radial arm 38 and reached the cone 23, it is split into a first flow f1 directed towards the inner space E to ventilate it, and a second flow f2 which circulates in the inter-wall space Ei. These two flows f1 and f2 meet at the outlet S during their discharge out of the cone 23.

The inner lining 42 extends along most of the inner face of the main wall 41, and the flow f2 is injected at the upstream end AM of the cone 23 so as to run along most of the main wall 41 that is exposed to the hot primary flow FP, before being discharged by the outlet S. This circulation allows limiting, and evening suppressing, heating up of the components located in the inner space E by the primary flow FP coming out of the exhaust casing, which tends to heat up the main wall 41 by convection and by radiation.

In the example of FIG. 4, the outlet S is formed by a cylindrical extension 43 of the main wall 41, which extends at the downstream end AV of the cone 23. In turn, the lining wall 42 also terminates in a cylindrical extension 44 with a smaller diameter which extends inside the cylindrical extension 43. This arrangement ensures that the discharges of the flows f1 and f2 do not disturb each other.

In the example of the figures, the system for cooling the inner space E is intended to discharge heat generated by the downstream bearing 34 and/or by the reduction gear 22, but it may be adapted to optimise cooling of any other type of components installed in this inner space.

What is claimed is:

1. A turbofan engine including
   an exhaust casing through which passes a primary flow and which is surrounded by a secondary flow, both the primary flow and the secondary flow circulating from upstream to downstream along a central longitudinal axis of the turbofan engine during operation, and
   an outlet cone having an upstream end carried by this exhaust casing, the outlet cone delimiting an inner space,
   wherein the exhaust casing includes a hollow radial arm crossing the primary flow which conveys part of the secondary flow in order to form a cooling flow to cool down one or several component(s) located in the inner space,
   wherein the outlet cone terminates in an outlet for discharging the cooling flow,
   wherein the outlet cone is formed by a main wall and includes an inner lining wall which runs along the main wall while being spaced therefrom so as to delimit, together with this main wall along most of an inner face of the main wall, an inter-wall space, and wherein a portion of the cooling flow passes through the inter-wall space before being discharged by the outlet, and wherein the inner lining wall comprises an extension into the hollow radial arm to collect the portion of the cooling flow that passes through the inter-wall space.

2. The turbofan engine according to claim 1, wherein the hollow radial arm terminates in a scoop soaking in the secondary flow to promote sampling of the cooling flow from the secondary flow.

3. The turbofan engine according to claim 1, wherein the outlet is formed by a cylindrical extension of the outlet cone.

4. The turbofan engine according to claim 1, wherein the outlet is formed by a cylindrical extension of the main wall and by a cylindrical extension of the inner lining wall which extends inside the cylindrical extension of the main wall.

5. The turbofan engine according to claim 1, comprising a low-pressure turbine driving a central shaft via an epicyclic reduction gear, and wherein this the one or several component(s) located in the inner space comprises this epicyclic reduction gear.

6. The turbofan engine according to claim 1, comprising a central shaft and a bearing for holding this central shaft, wherein the one or several component(s) located in the inner space comprises said bearing.

7. The turbofan engine according to claim 1, wherein said outlet is an opening formed at an end of the outlet cone centered on the central longitudinal axis.

* * * * *